No. 866,623. PATENTED SEPT. 24, 1907.
W. H. COLLIER.
VALVE GEAR.
APPLICATION FILED JAN. 8, 1906.

5 SHEETS—SHEET 1.

Witnesses:
H. Crocheron
G. A. Klimek

Inventor
W. H. Collier
By H. M. Marble
Attorney

No. 866,623. PATENTED SEPT. 24, 1907.
W. H. COLLIER.
VALVE GEAR.
APPLICATION FILED JAN. 8, 1906.

5 SHEETS—SHEET 3.

William H. Collier, Inventor

By H. M. Marble

Witnesses
Hu M. Harris.
H. H. Urmston.

Attorney

THE NORRIS PETERS CO., WASHINGTON, D. C.

No. 866,623. PATENTED SEPT. 24, 1907.
W. H. COLLIER.
VALVE GEAR.
APPLICATION FILED JAN. 8, 1906.

5 SHEETS—SHEET 4.

William H. Collier,
Inventor

By H. M. Marble
Attorney

Witnesses
H. M. Harris
H. H. Urmston.

No. 866,623. PATENTED SEPT. 24, 1907.
W. H. COLLIER.
VALVE GEAR.
APPLICATION FILED JAN. 8, 1906.
5 SHEETS—SHEET 5.
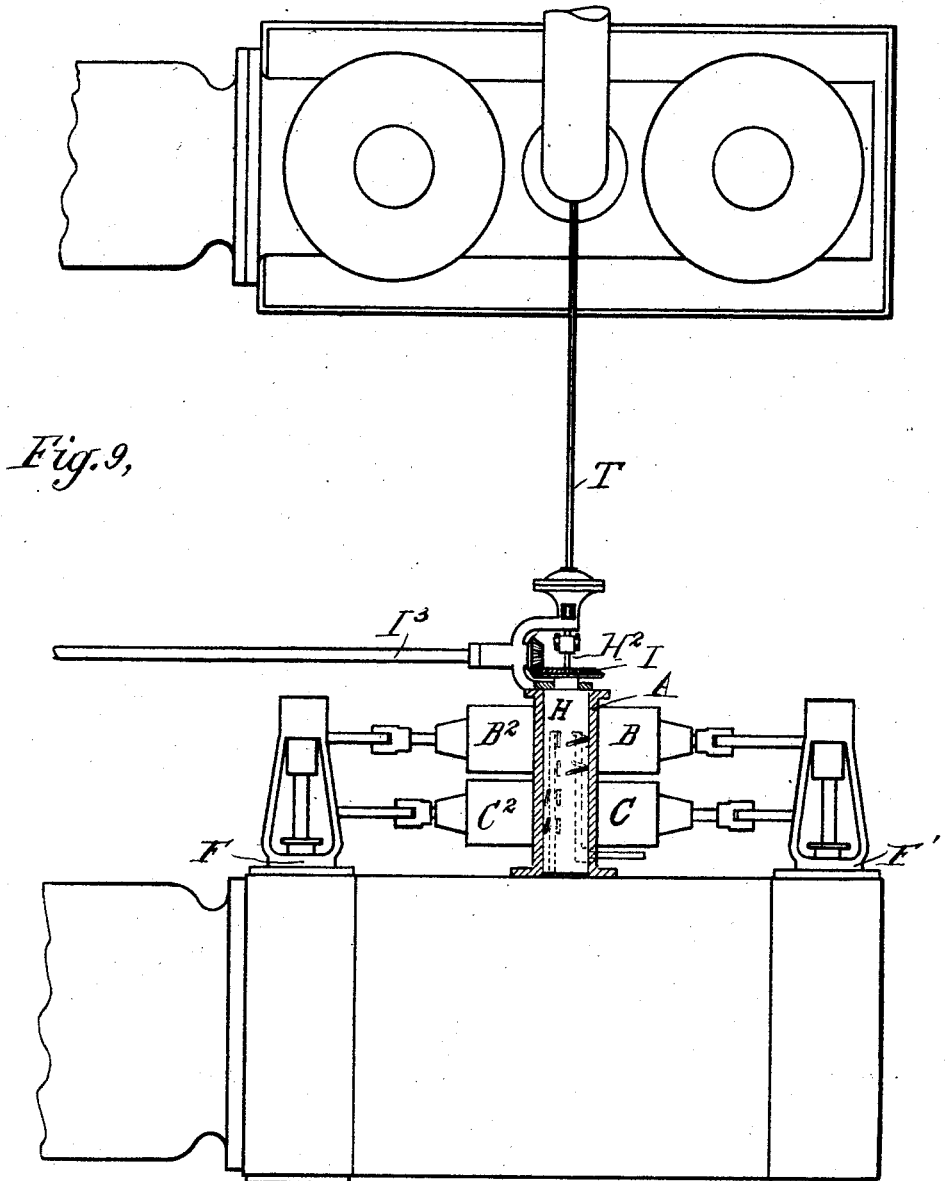
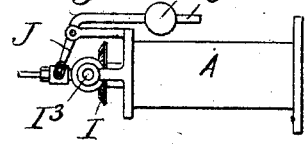

UNITED STATES PATENT OFFICE.

WILLIAM H. COLLIER, OF JACKSON, TENNESSEE.

VALVE-GEAR.

No. 866,623.

Specification of Letters Patent.

Patented Sept. 24, 1907.

Application filed January 8, 1906. Serial No. 295,082.

*To all whom it may concern:*

Be it known that I, WILLIAM H. COLLIER, a citizen of the United States, residing at Jackson, in the county of Madison and State of Tennessee, have invented certain new and useful Improvements in Valve-Gear, of which the following is a specification.

My invention relates to improvements in valve gear for steam and air engines, compressors, pumps, etc., and comprises improvements over the valve gear described in my Patents Numbers 814,275, dated March 6, 1906, and 823,105, dated June 12, 1906, particularly adapting such valve gear for air and gas compressors, blowing engines, pumps etc.

The objects of my invention, are, to improve and simplify the valve gear of steam engines, compressors, pumps etc., to obtain the efficient operation of the drop cutoff valve gear without the excessive limitation of speed characteristic of such valve gear, to improve and simplify automatic governing mechanism of engines, compressors, pumps and the like, to cause the fluid pressure against which a compressor, pump or the like operates to control directly the operation of the valve gear, and in general to make the valve gear simple, compact, economical, highly efficient, and reliable.

I will now proceed to describe my invention with reference to the accompanying drawings, illustrating certain applications of my invention, and will then point out the novel features in claims.

Figure 1:
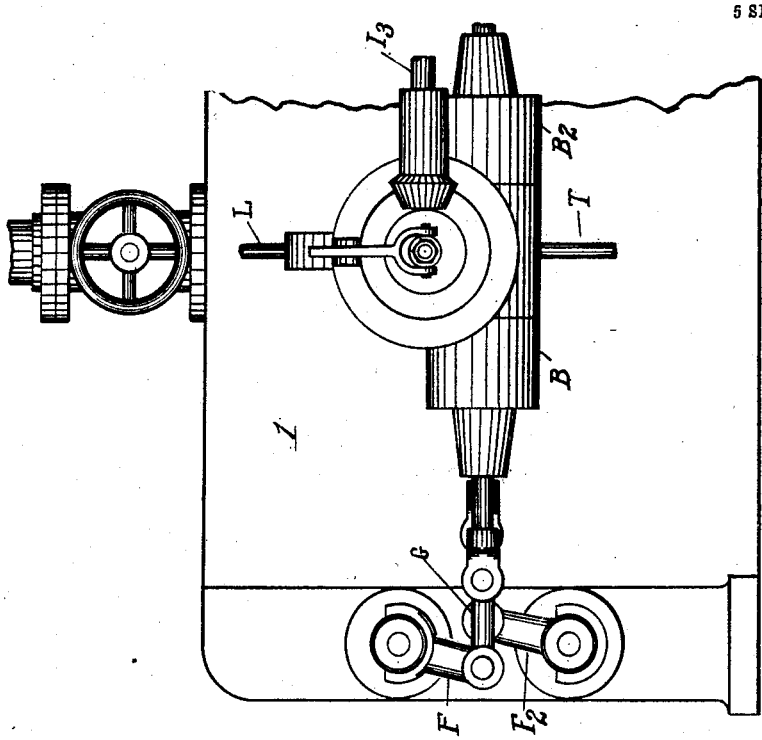
Figure 2:
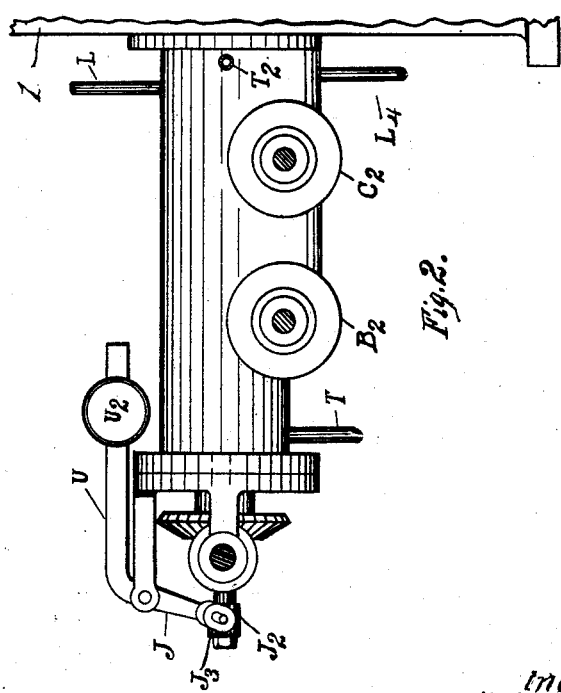
Figure 4:
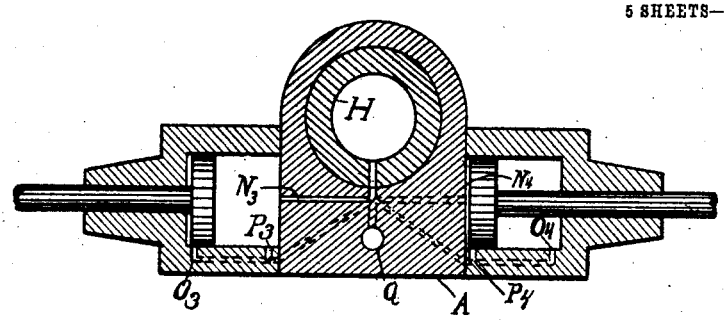
Figure 3:
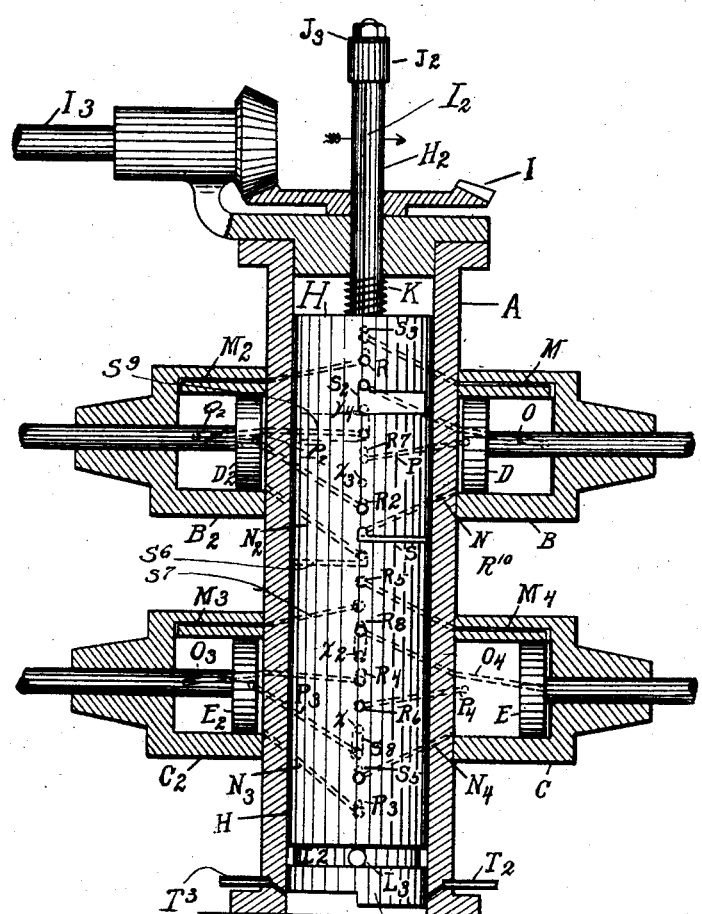
Figure 6:
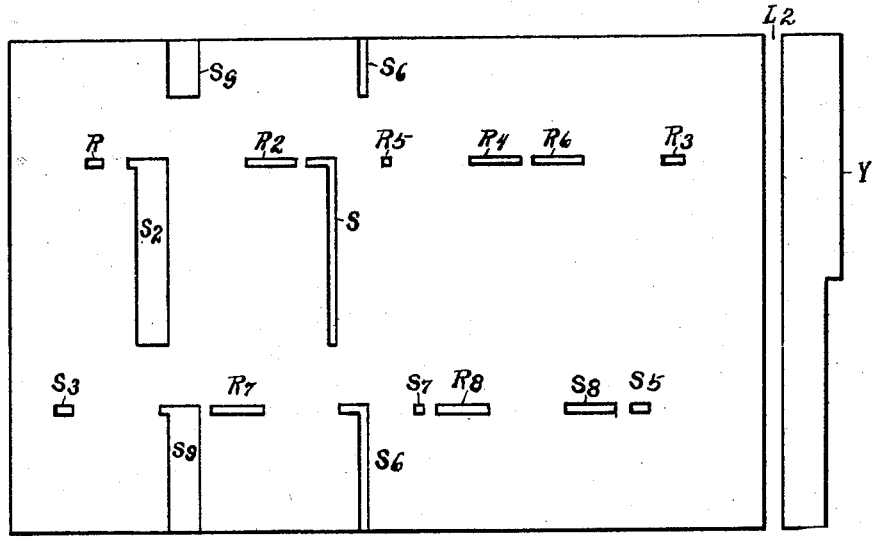
Figure 5:
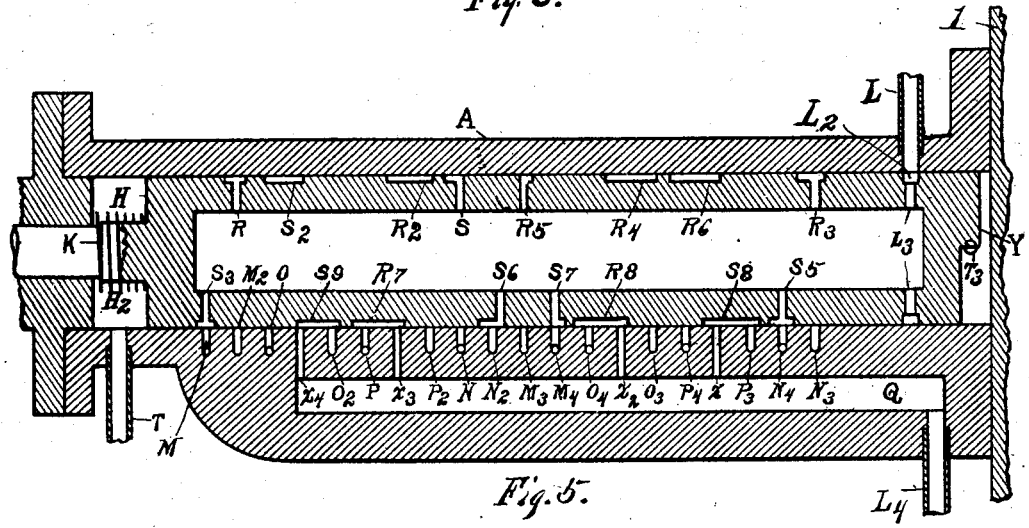
Figure 8:
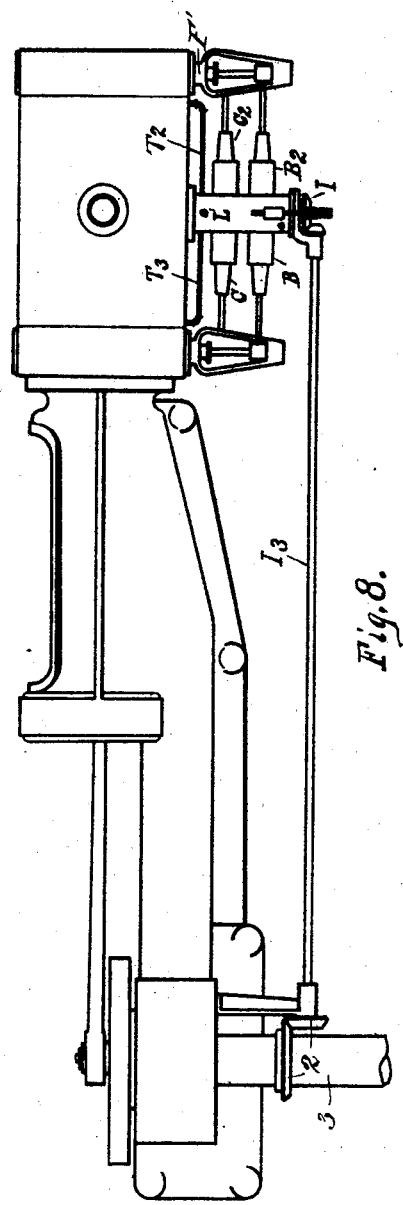
Figure 7:
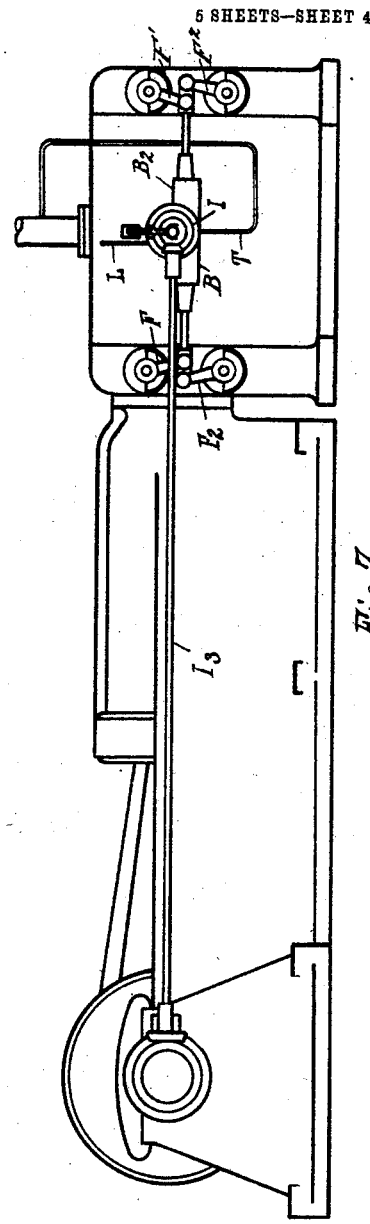

In the said drawings, Figures 1—8 inclusive show a form of fluid-pressure-operated valve gear embodying my invention and particularly applicable to the compression cylinders of compressors, Fig. 1 showing a side view of a portion of a compression cylinder fitted with my improved valve gear, Fig. 2 showing the same valve gear looking from the front or crank end of the engine backward, Fig. 3 showing a central longitudinal section of the pilot or controlling valve chamber and of the valve-actuating cylinders, the section being taken on a horizontal plane, and Fig. 4 showing a vertical transverse section of the same parts. Fig. 5 shows a vertical axial section through the pilot valve. Fig. 6 shows a development of this pilot valve. Figs. 7 and 8 show respectively, a side view and a top view of the compressor, the motor cylinder and associated parts being omitted. Figs. 9 and 10 illustrate the application of my invention to the motor or driving sides of pumps, etc., Fig. 9 showing a top view of the cylinders of a pump, the casing of the pilot valve of the motor cylinder being shown in section, and Fig. 10 being a detail view showing means for retracting the pilot valve of Fig. 9.

Valve gear of the type to which this invention relates comprise fluid-pressure-actuated means, such as cylinders and pistons, for operating the admission and exhaust or discharge valves of a working or compression or pumping cylinder, and a controlling or "pilot" valve controlling the operation of such fluid-pressure-actuated means, such controlling valve being by preference a rotary valve driven from the crank shaft or other suitable rotary member of the engine. By suitable arrangement of ports in the controlling valve and its chamber, and by arranging said valve to move longitudinally in its chamber as well as to rotate, the operation of the engine may be regulated independent of any throttle valve; as for example, by varying the points of cutoff and exhaust closure. In the valve gear herein described I employ a controlling valve which is, by preference, a rotary valve, and I cause the pressure or head against which the compressor or pump works to move the controlling valve longitudinally in the valve chamber, and thereby control the operation of the compressor or pump, and also open the discharge valves of the compressor when the compression pressure reaches that of the receiver.

Referring now to the accompanying drawings, A, (Figs. 3, 4 and 5), designates the main section or casing of the valve gear. It contains the valve chamber for the controlling or "pilot" valve H, and is preferably secured to the side of engine or compression cylinder, 1, as shown. To said member A are secured the cylinders for actuating the valves of such cylinder 1, there being four such actuating cylinders in the case of a four-valve engine. The cylinder 1 shown in Figs. 1 and 2 is assumed to be the compression cylinder of an air or gas compressor or the like.

B and $B_2$ designate the actuating cylinders, and D and $D_2$ the pistons, for actuating the delivery valves F and F' of the compressor, and C and $C_2$ designate the actuating cylinders, and E and $E_2$ the pistons, for actuating the suction or admission valves $F_2$ and $F_2'$ of the compressor, the piston rods of said pistons being connected to the arms of their respective valves by links G.

Controlling valve H is hollow, as shown especially in Figs. 4 and 5. It has a fixed stem, $H_2$, and is caused to rotate by a gear wheel I, connected to stem $H_2$ by means of a key working in a keyway $I_2$ in $H_2$, said gear wheel being driven by a bevel pinion on shaft $I_3$, said shaft being driven by suitable gearing 2, from the crank shaft 3 or other suitable revolving member of the engine, the gearing being of such ratio that the valve H rotates at the same speed as the crank shaft.

Beneath the valve H there is an exhaust passage, Q, connected to the chamber within which valve H rotates by suitable ports, as hereinafter described. The ends of valve H are closed, and both ends of the chamber within which the valve rotates are closed, means being provided for admitting fluid under pressure to such valve chamber, at opposite ends of the valve, for moving said valve longitudinally, as hereinafter described. A spring K acting on said valve serves to compensate for the portion of the outer head of the valve occupied by the stem $H_2$, and also to keep the valve in its extreme innermost position when there is no pressure acting against the inner head of the valve.

Fluid under pressure, such as steam or compressed air, is admitted to the interior of the valve, for operating the pistons of cylinders B, $B_2$, C, $C_2$, by means of a pipe L, (Figs. 2 and 5), in registry with a groove $L_2$ (Figs. 3 and 5) in valve H, said groove connected to the interior of valve H by a port $L_3$. Each of the actuating cylinders is provided with admission and exhaust ports for both of its ends leading to the chamber in which valve H revolves, and adapted to register with ports in said valve at suitable intervals during the revolution of the valve. The admission ports of these cylinders are designated by characters M and N (for cylinder B), $M_2$ and $N_2$ (for cylinder $B_2$), $M_4$ and $N_4$ (for cylinder C), and $M_3$ and $N_3$ (for cylinder $C_2$). The exhaust ports of these cylinders are designated by characters O and P (for cylinder B), $O_2$ and $P_2$ (for cylinder $B_2$), $O_4$ and $P_4$ (for cylinder C), and $O_3$ and $P_3$ (for cylinder $C_2$).

The inner end of the chamber within which valve H rotates is connected by pipes $T_3$ and $T_2$ to opposite ends of compression cylinder 1; and the outer end of said chamber is connected by pipe T to the receiver or some suitable part of the system maintained at receiver pressure. Therefore, in operation, the valve is subjected at one end to receiver pressure, and at the other end to the pressure in that end of the cylinder 1 in which compression is being effected. A projection Y on valve H acts as a valve to connect to the chamber of valve H only the pipe $T_2$ or $T_3$ of that end of the cylinder in which compression is being conducted.

Valve H has the following ports, extending through to its inside chamber, for admitting working fluid to the valve-actuating cylinders: $S_3$ and R, on opposite sides of the valve, for ports M and $M^2$ respectively; S and $S_6$, on opposite sides of the valve, for ports N and $N_2$ respectively; $R_5$ and $S_7$, on opposite sides of the valve, for ports $M_4$ and $M_3$ respectively; and $S_5$ and $R_3$, on opposite sides of the valve, for ports $N_4$ and $N_3$ respectively. Valve H has also in its surface the following grooved ports or cavities, not extending through to the interior of the valve, constituting exhaust ports and serving to connect the exhaust ports of the actuating cylinders to exhaust passage Q (such passage Q being connected to the valve chamber by four ports, $x$, $x_2$, $x_3$, and $x_4$): $S_2$ and $S_9$, for cylinder ports O and $O_2$ respectively; $R_7$ and $R_2$, for cylinder ports P and $P_2$ respectively; $R_8$ and $R_4$, for cylinder ports $O_4$ and $O_3$ respectively; and $R_6$ and $S_8$, for cylinder ports $P_4$ and $P_3$ respectively. Exhaust port $x_4$ registers at suitable times with cylinder ports $S_2$ and $S_9$; port $x_3$ with cylinder ports $R_7$ and $R_2$; $R_8$ and $R_4$ with $x_2$; and $R_6$ and $S_8$ with $x$. Valve ports $S_2$, $S_9$, S and $S_6$ are not merely longitudinal slots, as are the remaining ports, but have circumferentially-extending portions extending through such arcs that outward motion of the valve in any angular position thereof during the compression period in either end of cylinder 1 will bring one of each pair of these ports into registry with the corresponding cylinder port.

The operation of the valve gear is as follows: In the position of the parts shown in Fig. 3, (assuming that inward movement of the actuating pistons closes the corresponding valves of cylinder 1 and that outward movement of said piston opens said valves), both discharge valves F and F' operated respectively by pistons D and $D_2$ are closed and the admission valve $F_2$ (controlled by piston E) is open, and the compressor is compressing into the front or crank end of cylinder 1, one end of the valve H being subjected to pressure in this end of the cylinder, the mouth of pipe $T_3$ being open, the pressure in the other end of the valve chamber being that of the receiver, (such receiver pressure being transmitted through pipe T). When compression pressure exceeds receiver pressure, valve H is forced outward, until the circumferential portions of ports $S_6$ and $S_9$ register with cylinder ports $N_2$ and $O_2$, whereupon piston $D_2$ of discharge valve F' moves outward, opening discharge valve F', and so causing the compressor to discharge into the receiver, the pressures acting against the two ends of valve H being equalized at the end of the stroke, so that valve H moves inward again when port $T_2$ is opened by valve-projection $y$. At the end of the stroke, piston E is caused to move inward and to close valve $F_2$, by ports $R_5$ and $R_6$ of the valve opening steam and exhaust ports $M_4$ $P_4$ respectively, and piston $E_2$ controlling valve $F_2'$ is moved outward and valve $F_2'$ opened owing to ports $R_3$ and $R_4$ of valve H opening steam and exhaust ports $N_3$ and $O_3$ respectively; and at the same time ports R and $R_2$ of the valve open ports $M_2$ and $P_2$, causing piston $D_2$ to move inward and close discharge valve F'. Fluid is then compressed into the rear end of cylinder 1, and when pressure in such end exceeds receiver pressure, valve H moves out as before, until the circumferential portions of ports S and $S_2$ register with ports N and O, respectively, when piston D moves outward, opening discharge valve F. This operation continues in the manner described until the pressure in the receiver, acting against the front end of valve H, moves the same inward against weight $U_2$ (Fig. 2) mounted upon the lever U connected to valve stem $H_2$ through collar $J_2$. Valve H then moves inward, beyond its normal position, its ports being of such length longitudinally that while ports $S_3$, R, $R_7$, $R_2$, $S_5$, $R_3$, $R_8$ and $R_4$ will still register with their respective cylinder ports during the rotation of valve H, ports $S_2$, $S_9$, S, $S_6$, $R_5$, $R_6$ and $S_8$ will no longer register with their respective cylinder ports, so that the discharge valves F and F' will be closed and cannot be opened again, and the admission valves $F_2$ and $F_2'$ will be opened and cannot be closed again, until, the pressure in the receiver falling, weight $U_2$ moves the valve out again, whereupon the normal operation of the valves will be resumed. This closing of the discharge valves, and opening of the admission valves, whereby the compressor piston moves idly, is termed "unloading the compressor".

Obviously the invention as above described, and involving, essentially, the idea of a pilot or actuating valve controlling the valve-actuating pistons, but arranged to be moved longitudinally by fluid-pressure to vary the action of the valves, is not confined to the compression cylinders of compressors, blowing engines, and other pumps, but is applicable as well to the valve gear of motor cylinders. In Figs. 9 and 10 I illustrate valve gear for the motor or driving cylinder of a pump, comprising a pilot valve H, valve-actuating cylinders B and $B_2$ for the admission valves of said cylinder, and similar valve-actuating cylinders C and $C_2$ for the exhaust valves of said motor cylinder, said pilot valve actuated in one direction by a weight $U_2$, and arranged to be actuated in the other direction, in opposition to such weight, by fluid under the pressure of the head against which the pumping cylinder works, such pressure being conveyed through pipe T.

What I claim is:—

1. In valve gear, the combination with a plurality of fluid-pressure-actuated valve-operating means, of a controlling valve for the same having ports adapted to register with ports of said valve-operating means, means for driving said controlling valve, and fluid-pressure means for shifting said valve in a direction other than that of its normal motion, said valve comprising means whereby when the valve is so moved in a direction other than that of its normal motion, the operation of said fluid-pressure-actuated valve-operating means is varied.

2. In valve gear, the combination with a plurality of fluid-pressure-actuated valve-operating means, of a controlling valve for the same having ports adapted to register with ports of said valve-operating means, said valve arranged to be driven normally in one direction and to be fluid-pressure-actuated in another direction to vary its operation, and means for moving the valve in both such directions said valve comprising means whereby when the valve is so moved in a direction other than that of its normal motion, the operation of said fluid-pressure-actuated valve-operating means is varied.

3. In a valve gear, the combination with a plurality of fluid-pressure-actuated valve-operating means, of a rotary controlling valve, a valve-chamber therefor, means for rotating said valve, means tending normally to move said valve longitudinally in such chamber, and means for admitting fluid under pressure to the chamber to oppose such movement said valve comprising means whereby when the valve is so moved longitudinally, the operation of said fluid-pressure-actuated valve-operating means is varied.

4. In a valve gear, the combination with a plurality of fluid-pressure-actuated valve-operating means, of a rotary controlling valve, a valve-chamber therefor, means for rotating said valve, and means for admitting fluid under pressure to said chamber on opposite sides of said valve to move the valve longitudinally said valve comprising means whereby when the valve is so moved longitudinally, the operation of said fluid-pressure-actuated valve-operating means is varied.

5. In a valve gear, the combination with a plurality of fluid-pressure-actuated valve-operating means, of a rotary controlling valve, a valve-chamber therefor, means for rotating said valve, means for admitting fluid under pressure to said valve comprising means whereby when the valve is so moved longitudinally, the operation of said fluid-pressure-actuated valve-operating means is varied, said chamber to move said valve longitudinally therein, and a loading device resisting such movement.

6. In a valve gear, the combination with a plurality of fluid-pressure-actuated valve-operating means, of a controlling valve therefor adapted normally to be moved in one direction but adapted also to be moved in another direction for varying the action of the valve gear, said valve having ports which open and close ports of such valve-operating means in proper sequence during the normal motion of said valve, and having also ports which are brought into registry with ports of said valve-actuating means by movement of the controlling valve in such second direction, and fluid-pressure means for so moving said valve.

7. In a valve gear, the combination with a plurality of fluid-pressure-actuated valve-operating means, of a rotary controlling valve, a valve chamber therefor, means for rotating said valve, and fluid-pressure means for moving said valve longitudinally in its chamber, said valve having ports which open and close ports of such valve-operating means in proper sequence during the normal rotation of the valve, and having ports which are brought into communication with ports of said valve-operating means by longitudinal motion of the valve.

8. In a valve gear, the combination with a plurality of fluid-pressure-actuated valve-operating means, of a rotary controlling valve, a valve chamber therefor, means for rotating said valve, means for admitting fluid under pressure from different sources to opposite ends of said chamber to move the valve longitudinally, said valve having ports which open and close ports of said valve-actuating means during rotary and during longitudinal motion of said valve.

9. In a valve gear for compressors and the like, the combination with a plurality of fluid-pressure-actuated valve-operating means controlling admission and discharge valves for opposite ends of the compressor cylinder, of a rotary controlling valve, a valve chamber therefor, means connecting one end of said chamber to opposite ends of said cylinder and for admitting fluid at receiver pressure to the opposite end of said chamber, means for rotating said valve, the latter having means for cutting off from the valve chamber that end of the cylinder in which compression is not taking place, and having also ports which open and close ports of said valve-actuating means during rotary and during longitudinal motion of said valve.

In testimony whereof I affix my signature, in the presence of two witnesses.

WILLIAM H. COLLIER.

Witnesses:
 OLIVER BENTON,
 I. A. RAINEY.